March 18, 1952 C. N. HICKMAN 2,589,806

SELECTIVE SIGNALING SYSTEM

Filed July 3, 1947 4 Sheets-Sheet 1

INVENTOR
C. N. HICKMAN
BY J. W. Schmied
ATTORNEY

March 18, 1952 C. N. HICKMAN 2,589,806

SELECTIVE SIGNALING SYSTEM

Filed July 3, 1947 4 Sheets-Sheet 2

INVENTOR
C. N. HICKMAN
BY J. W. Schmied
ATTORNEY

March 18, 1952 C. N. HICKMAN 2,589,806

SELECTIVE SIGNALING SYSTEM

Filed July 3, 1947 4 Sheets-Sheet 3

INVENTOR
C. N. HICKMAN

BY J. W. Schmied

ATTORNEY

March 18, 1952 C. N. HICKMAN 2,589,806

SELECTIVE SIGNALING SYSTEM

Filed July 3, 1947 4 Sheets-Sheet 4

INVENTOR
C. N. HICKMAN
BY J W Schmied
ATTORNEY

Patented Mar. 18, 1952

2,589,806

UNITED STATES PATENT OFFICE 2,589,806

SELECTIVE SIGNALING SYSTEM

Clarence N. Hickman, Jackson Heights, N. Y., assignor to Bell Telephone Laboratories, Incorporated, New York, N. Y., a corporation of New York Application July 3, 1947, Serial No. 758,904

10 Claims. (Cl. 177—353)

This invention relates to selective signaling systems and particularly to electrical impulse signaling systems for telephone or telegraph station calling.

One object of the invention is to provide an improved telephone calling system responsive to code groups of electrical impulses generated in sequence by such conventional means as a standard telephone dial.

Another object of the invention is to provide impulse selective signaling means which are free from rotating mechanical parts and which are more compact and more economical than the ratchet type selector switches now in use.

A further object is to provide an impulse selective signaling system which is responsive to only one particular sequence of impulse code groups and which will automatically be restored to normal upon reception of any group not next in sequence of the particular assigned code.

Still another object is to provide a selective calling system which will restore to normal upon completion of a call, or prior to transmission of any call.

A still further object is to provide an improved type of magnetic contact counting relay suitable for counting electrical impulses.

Automatic telephone signaling systems now in service generally employ ratchet type selector switches which include a rotating contact arm sweeping across fixed contacts step by step as a mechanical ratchet is advanced in response to electrical impulses. Certain disadvantages of such selectors are that they are cumbersome and bulky, require careful adjustment, are slow to respond and require considerable power for their operation due to the mass of moving parts and the distance through which motion is required. Furthermore, noise may be introduced into the communication system through wear of the wiping contacts. Even the most modern of selector switches are delicate, costly pieces of apparatus, and are not well suited to such applications as mobile radio telephone installations.

To overcome these disadvantages the inventor has devised a selective signaling circuit employing magnetic contact counting relays of the type disclosed by G. R. Stibitz in Patent 2,305,450, issued December 15, 1942. I have also discovered that relays of this type may be improved by a staggered arrangement of fixed pole-pieces and by a bifurcated design for the magnetic armature reed, whereby the over-all height of a relay structure with a given number of contacts may be reduced by one-third and continuous positive closure is assured at all contacts. Details of the magnetic contact counting relay which I have devised as part of my selective signaling system will become apparent from a study of the accompanying drawings as described hereafter.

Figure 1:
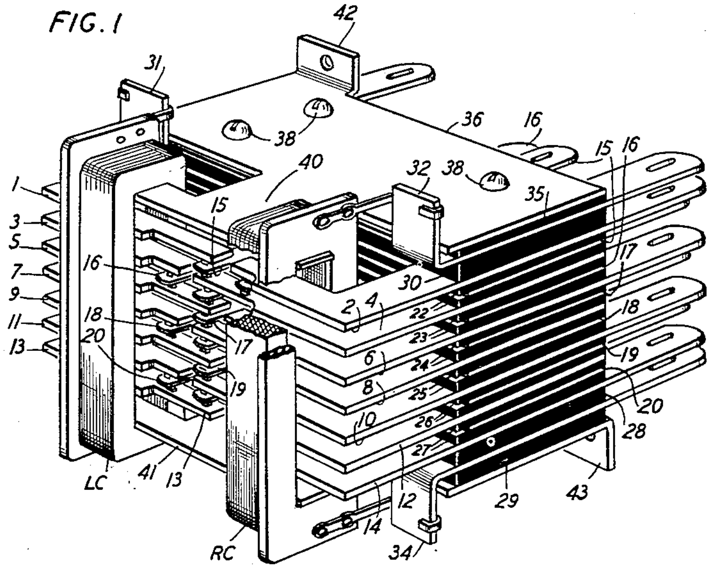
Fig. 1 is a perspective drawing of a relay of the type embodied in the present invention.
Figure 2:
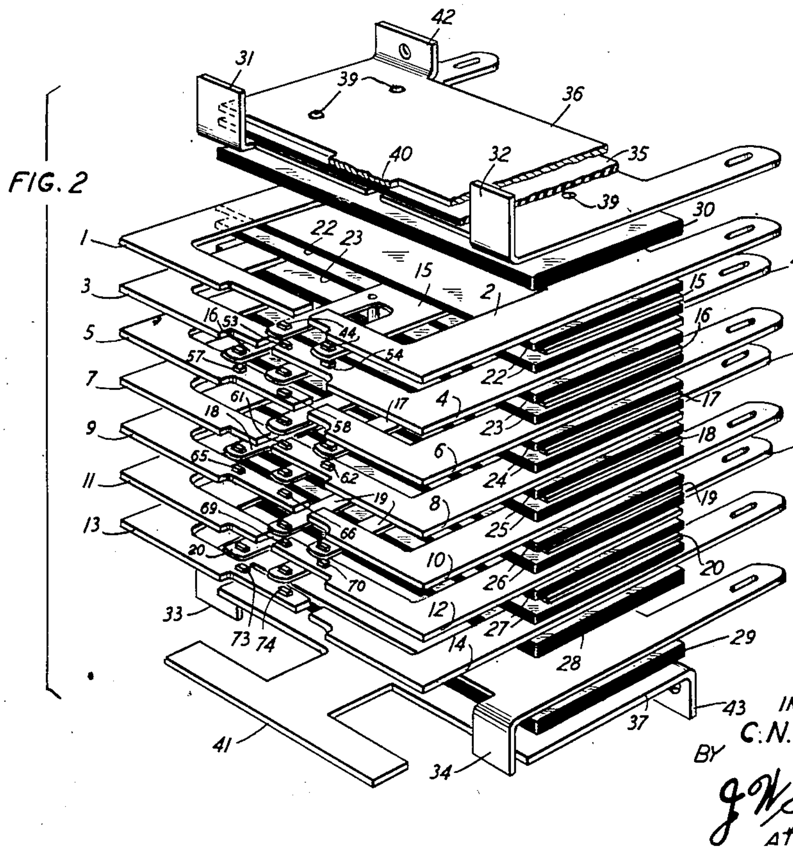
Fig. 2 is an exploded and partly cut-away view of the relay of Fig. 1 more clearly disclosing certain elements thereof.
Figure 5:
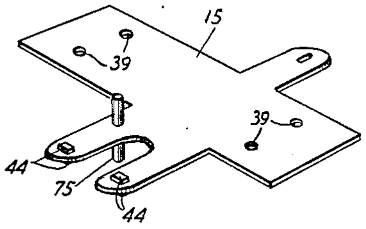
Figure 6:
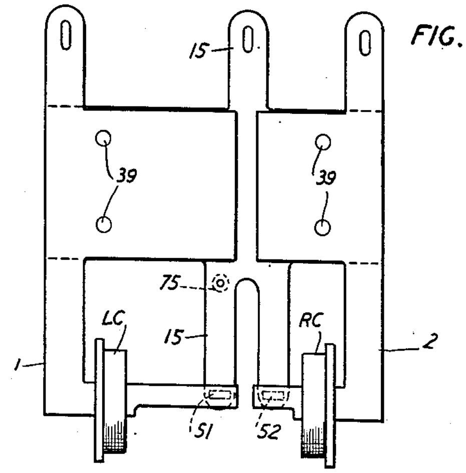
Figure 6A:
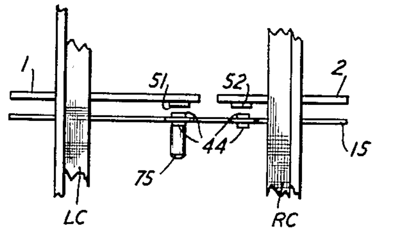

Fig. 5 shows another armature element with an alternative arrangement at the insulating stud. In this case, if the stud extends on both sides of the armature, only alternate armature laminations in a relay stack need be provided with studs. This alternative arrangement may be a more economical form of construction for the manufacture of magnetic contact counting relays of the type herein disclosed;

Fig. 6 is a plan view of one layer of laminations for the relay of Figs. 1 and 2 showing the configuration of pole-pieces 1 and 2 and armature reed 15 immediately below;

Fig. 6A is a front view of Fig. 6 showing the insulated stud 75 which is secured to and extends from armature reed 15.

Figure 7:
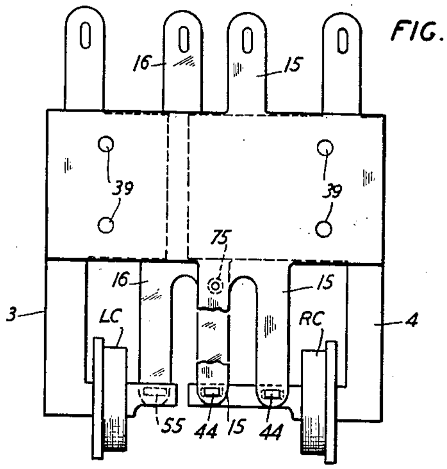
Figure 7A:
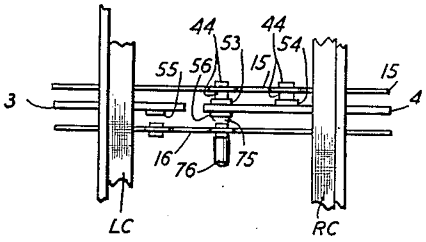
Figure 8:
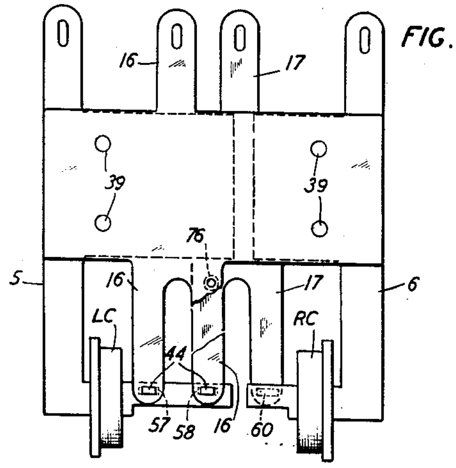
Figure 8A:
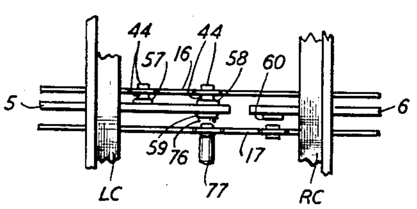

The assembly illustrated by Figs. 6 and 6A may be the first, or top, layer of a relay stack such as shown by Figs. 1 and 2;

Fig. 7 is a plan view of the next layer of field laminations adjacent to the layer of Fig. 6, showing the armature reed 15 of Fig. 6 in position immediately above the right field lamination 4 and another reed armature 16 offset to the left and immediately below in juxtaposition to the underside of both the left and right field laminations 3 and 4, respectively;

Fig. 7A is a front view of Fig. 7, showing insulating stud 75 extending from armature 15 and bearing upon armature 16, and stud 76 extending from armature 16;

Fig. 8 is a plan view of a third layer of field laminations next adjacent to the layer of Fig. 7, showing the lower armature reed 16 of Fig. 7 adjacent to and above the left field lamination 5 of this third layer, and a fifth armature reed 17 offset to the right and below in juxtaposition to the underside of both field laminations 5 and 6 of this layer;

Fig. 8A is a front view of Fig. 8 showing insulated stud 76 extending from armature 16 and bearing upon armature 17, with stud 77 extending from armature 17.

Figure 9:
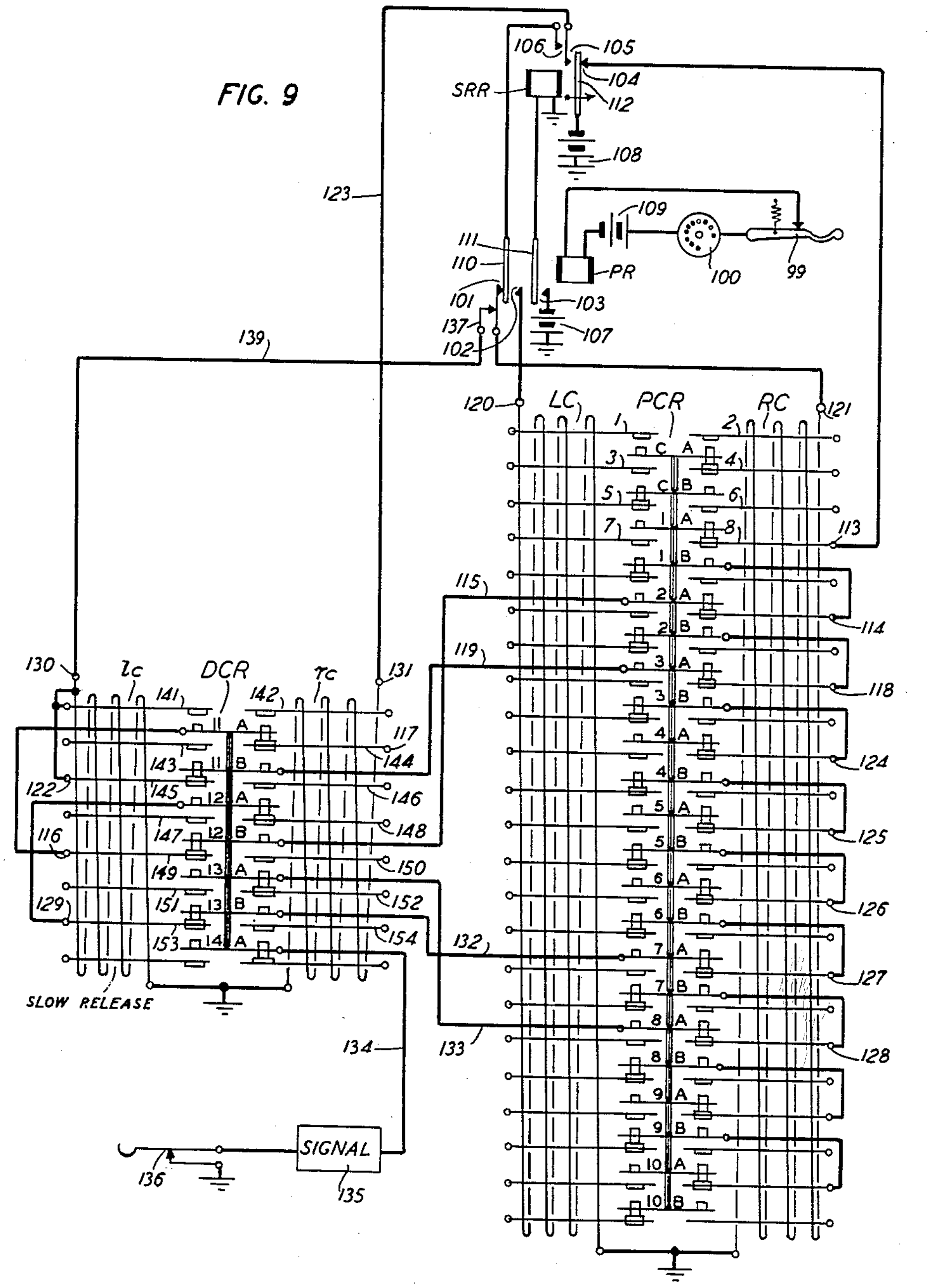

The fourth layer of the laminated stack is not shown in separate drawings but would appear the same as the first layer illustrated by Figs. 6 and 6A. Similarly, the fifth layer corresponds to the second layer as illustrated by Figs. 7 and 7A, etc.; and Fig. 9 is a schematic diagram showing the interconnection of two counting relays of the type herein disclosed with a slow-release relay and a pulse relay of conventional type, to comprise the complete selective signaling circuit comprehended by the present invention.

Before discussing detailed operation of the complete signaling circuit, the structure and operation of the magnetic contact counting relay, which is the heart of my signaling system, will first be described. Referring to Figs. 1 to 8, it will be seen that the relay structure includes an upper left field lamination 1, and an upper right field lamination 2, positioned in the same plane but not in conductive engagement with each other, spaced below these laminations, in a plane parallel to the first layer, another pair of left and right field laminations 3 and 4, respectively, but not in conductive engagement with each other, and interposed between the two layers an armature lamination 15, the shape of which is clearly disclosed by the perspective drawing Fig. 5, and by the plan view of Fig. 6. The armature lamination 15 is insulated from the adjacent field laminations by interposed laminations 22 of insulating material. Armature reed 16 similar to 15 but offset to the left is interposed between the second and third layers of field laminations 3, 4 and 5, 6. Similarly, armature reeds 18 and 20, which are identical with 16, are offset to the left and interposed between the fourth and fifth layers and sixth and seventh layers of field laminations, respectively. In like manner, armature reeds 17 and 19, which are identical with reed 15, are respectively interposed between the third and fourth, and fifth and sixth, layers of field laminations. The armature reeds in each layer are insulated from their adjacent field laminations by interposed laminations of insulating material 22 through 27. The top and bottom of the stack are bounded by clamping plates 36 and 37, respectively, formed of non-magnetic material, and held in a rigid assembly by screws 38. Clamping plates 36 and 37 are insulated from the remaining structure by insulating laminations 35 and 29. Interposed between the top clamping plates and the top layer of field laminations are left and right coil terminal supports 31 and 32, respectively, insulated from each other and from the remaining structure by insulating laminations 35 and 30. At the opposite end of the stack, between the bottom clamping plate and the bottom layer of field laminations, are placed bottom coil terminal supports 33 and 34, insulated from each other and from the remaining structure by laminations of insulating material 28 and 29.

Surrounding the pole-pieces of the left field laminations is energizing coil LC, as shown in Fig. 1, supported by forward extending T portions of top and bottom clamping plates 40 and 41, and by terminals secured to brackets 31 and 33. Surrounding the pole-pieces of the right field laminations is energizing coil RC shown partially cut away in Fig. 1, supported by the same forward-extending T portions 40 and 41, and by terminals secured to bracket 32 and 34. Coils LC and RC may, if desired, be wound upon copper sleeves to provide slow-release characteristics for either side of the relay device. As will be seen in the detailed dscription of the preferred arrangement of my selective signaling system which follows, coil LC of one such relay is provided with such a slow-releasing copper sleeve.

The completed assembly is clamped together by means of bolts 38 which extend through aligned holes 39 in the assembled members and which may be threaded into tapped holes in the lower clamping plate 37 or into locking nuts at their lower ends. These bolts are insulated from the assembled members through which they pass by means of insulating sleeves. The upper and lower clamping plates 36 and 37 are provided with out-turned ears 42 and 43 which serve as mounting brackets by means of which the complete relay structure may be secured to a suitable relay rack. The end clamping plates are formed of non-magnetic material, whereas the armature reeds and field piece laminations are formed of magnetic material having a high degree of permeability.

The armature reeds extend forwardly in a position to move freely between the faces of the left and right energizing coils LC and RC, and between the pole-pieces of the associated field laminations. Secured to both the top and bottom surfaces of the forward-extending end of each armature reed are contacts 44 of magnetic material, shown clearly in Figs. 3 and 4. Secured to corresponding surfaces of adjacent pole-pieces, as seen in Figs. 2, 3 and 7A, are similar contacts of magnetic material 53 and 54 so placed as to engage conductively with corresponding armature reed contacts 44.

This structure differs from the relay disclosed by Stibitz in Patent 2,305,450 in that my armature reeds and associated pole-pieces are grouped in a staggered arrangement which permits a reduction of one-third in the over-all height of a relay for any given purpose. This makes for a more compact structure which is more economical of manufacture and more reliable in operation. The manner in which these advantages are brought about will be more clearly understood from a detailed analysis of the relay operation which follows.

In idle condition, with neither left nor right operating coils energized, the armature reeds may extend freely between alternate layers of pole-pieces without conductive engagement between contacts. However, to make the relay less sensitive to vibration or mechanical shock these armature reeds are normally biased into conductive engagement with the lower pole-piece in each layer as illustrated by Fig. 3.

Figure 3:
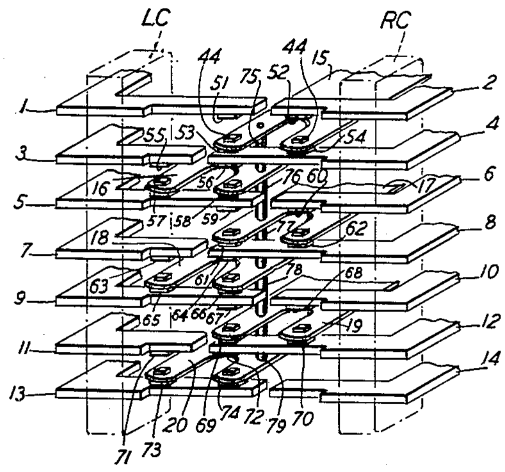
Fig. 3 is a front view with perspective to show the assembly of field pole-pieces with their related armatures and insulated studs. All armatures here illustrated are in their normal downward biased positions.
Figure 4:
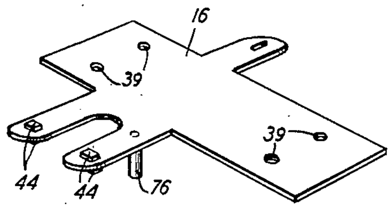
Fig. 4 shows a single armature lamination with insulated stud extending downwardly.

Reference is now made to Fig. 3 which is a perspective drawing illustrative of the essential operating elements embodied in a three-digit counting relay such as Fig. 1, viewed from the front. It will be observed from Figs. 3, 4, 6A, 7A and 8A that an insulated stud is secured to the underside of each armature reed in such manner that its free end extends downwardly between layers and rests upon the next armature immediately below. These studs are hidden from view in drawings Figs. 1 and Fig. 2 but are clearly represented in Fig. 3 by element 75 secured to armature 15, 76 secured to armature 16, 77 secured to armature 17, 78 secured to armature 18 and 79 secured to armature 19.

By the alternative form of construction illustrated in Fig. 5, the insulating stud may be made to extend through the armature reed so as to protrude an equal distance both above and below the armature lamination, with which arrangement studs need be provided only for every alternate armature lamination in a given stack. This construction may be more economical of manufacture, but in either arrangement, whether each armature be provided with an insulating stud extending in one direction only or whether alternate armatures be provided with through-extending studs protruding in both directions, the operation of the relay device will be the same.

Now, to analyze the operation of this relay we start from idle condition with all armatures biased downwardly into conductive engagement with the adjacent pole-piece immediately beneath each armature. It will be seen that if the right-hand energizing coil RC is first energized, no action will take place because the top armature 15 will be held against its lower right-hand pole-piece 4 in conductive engagement with magnetic contacts 53 and 54 through the magnetic attraction of this pole. Although this pole-piece 4 is also exerting an upward attraction for armature 16, it will be seen that this armature is prevented from moving upwardly through the downward force exerted by insulated stud 75. Similarly, armature 18 which is now attracted by right-hand pole-piece 8 is prevented from rising through the intervention of insulated stud 77 which is secured to armature 17 now held in conductive engagement with pole-piece 8 through magnetic contacts 61 and 62 and also held down by stud 76 depending from armature 16. In like manner, each successive armature is disabled by the downward force from each insulating stud secured to the armature immediately above. Now if the left-hand energizing coil is next energized, it will be seen that no action takes place because top armature 15, although subjected to an upward force from the magnetic pull of left-hand pole-piece 1, is still held in conductive engagement with right-hand pole-piece 4 so long as right-hand energizing coil RC is energized. However, if coil RC is next deenergized, armature 15 will then be attracted upwardly into conductive engagement with left-hand pole-piece 1 through magnetic contact 51. This lifts insulating stud 75 from the top of armature 16 but no motion of armature 16 occurs because this armature is now held in conductive engagement with left-hand pole-piece 5, through magnetic contacts 57 and 58. Now if coil RC is energized, no further action will take place until coil LC is deenergized at which time armature 16 will be attracted upwardly into conductive engagement with right-hand pole-piece 4 through magnetic contact 56. When armature 16 comes up, its insulated stud 76 is lifted from armature 17 thus enabling armature 17 to operate upon the next sequential energization of coil LC followed by deenergization of coil RC. In this manner subsequent armatures may be successively enabled and operated through sequential energization and deenergization alternately of coils LC and RC. Thus if the two energizing coils are properly connected with a continuity changeover pulsing relay, a means is provided for counting electrical impulses as received. In such an arrangement one relay armature comes up when an electrical impulse starts and the next armature immediately below comes up when the impulse ends, thus two armatures are employed for counting each impulse. The structure of Fig. 3 which we have just examined, contains only six armatures which would enable this device to count only three pulses.

The manner in which such impulse counting may be employed for selective signaling in a telephone or telegraph system will now be described. Referring to Fig. 9 which is a complete schematic diagram of two magnetic contact counting relays PCR and DCR connected with an associated pulsing relay PR and slow-release relay SRR to comprise an operative selective signaling system wired for the call number 2167, we see that the pulse counting relay, designated PCR in this circuit, has twenty-two armatures which would enable this relay to count eleven impulses. However, in the circuit disclosed by Fig. 9, the first impulse is not counted but is used for the purpose of clearing all counting relays which may be connected to the same signaling circuit. The second counting relay in this circuit is a digit counting relay designated DCR and connected with the pulse counting relay PCR in such manner that the DCR will count all digits of the station call correctly received in the form of coded impulses. In the system as shown, any digit may contain from one to ten impulses. These impulses come from battery 109 through a standard telephone dial 100 to the pulse relay PR. The pulse relay PR is a continuity transfer relay, the sequence of operation being as follows: Contact 102 is made, 101 is broken, 137 is broken and finally 103 is made. Upon the closing of contact 103 a potential from battery 107 is applied to slow-release relay SRR. Upon energization of slow-release relay SRR, armature 112 closes with contact 105 before contact 104 is broken. Also contact 106 closes before contact 104 has opened. A circuit is now closed from battery 108 through armature 112, contact 105 and contact 106 of slow-release relay SRR, thence to armature 110 of pulse relay PR, through contact 102 to terminal 120 of coil LC, thence through the winding of coil LC to ground. Also a circuit is closed from battery 108 through armature 112 and contact 105 to terminal 131 of coil *rc* in the digit counting relay, thence through *rc* to ground. Thus on reception of the first impulse, coil LC of PCR is energized and armature tongue CA comes up in response to the magnetic attraction of pole-piece 1. Coil *rc* of DCR is also energized but no action here takes place as armature tongue 11A is held down by magnetic attraction of its lower right-hand pole-piece 144. Armature CB of PCR is held down by the magnetic attraction of the third left-hand pole-piece 5. Armature CB through its insulating stud holds down armature 1A. Similarly, all the remaining armatures in the PCR stack are held down. In like manner, armature 11A of DCR holds down armature 11B which would otherwise be attracted upwardly.

At the end of the first impulse, relay PR releases, contact 103 opens, SRR is momentarily deenergized but does not respond because this is a slow-release relay, and contact 101 closes thereby energizing coil RC of PCR, a circuit now being closed from battery 108 through armature 112, contact 105, contact 106, armature 110 and contact 101 to RC terminal 121, thence through coil RC to ground. At this instant both coils RC and LC of PCR are energized, but no further action has taken place, tongue CB of PCR being held down by magnetic attraction to its lower left pole-piece 5. Next contact 102 opens and coil LC of PCR is deenergized allowing armature CB to come up under the attraction of the second right-hand pole-piece 4 in pulse counting relay PCR. The first pulse has now been counted and armatures CA and CB of pulse counting relay PCR are both up.

At the start of the second pulse, which occurs before relay SRR has had time to release, the operation is identical with the start of the first pulse, that is, in sequence, coil LC of PCR is energized, coil RC of PCR is deenergized and armature 1A comes up. Coil *rc* of DCR remains energized and no action occurs here. At the end of the second pulse, relay PR releases and action is similar to that which occurred at the end of the first pulse. At this time armature 1B of PCR goes up and closes a path from fixed terminal 113 through armature 1B to fixed terminal 114, thence through armature 2A and line 115 to armature 12B of DCR, thence through fixed terminal 116 to armature 11A of DCR. However, as there is no connection from fixed member 117 with which armature 11A is in contact, no circuit is completed and no further action occurs.

Upon reception of the next pulse, operation is the same as before except that at the end of this pulse a path is closed to the *lc* coil of digit counting relay DCR from fixed terminal 113 through armature 1B to fixed terminal 114, thence through armature 2B to fixed terminal 118, thence through armature 3A and lead 119 to armature 11B of digit counting relay DCR, thence through fixed terminal 122 to coil *lc* of DCR. However, since contact 104 of SRR is now open, coil *lc* of DCR is not energized. Coil *rc* of DCR remains energized, armature 11A remains down and no action occurs in DCR. At the start of the fourth pulse continuity from terminal 113 to line 119 is broken by armature tongue 3A going up in PCR. At the end of the fourth pulse, armature 3B of PCR comes up and no other action occurs. Upon reception of the fifth pulse, armatures 4A and 4B or PCR come up and no further action occurs.

Assuming that the digit 4 has been dialed (it will be remembered that the system is set to employ one more pulse than the number of the digits), there will now be an interruption in the steady transmission of impulses following the fifth pulse. This prolonged interval between digits will allow slow-release relay SRR to release. When the SRR relay releases the following operation takes place: Contact 104 closes but no circuit is completed thereby, contact 106 opens, coil RC of pulse counting relay PCR is deenergized and all armatures of this relay fall into their idle positions, contact 105 opens and coil *rc* of digit counting relay DCR is thereby deenergized. No action occurs in DCR because all armatures are already down in their normal idle position. Thus we see that digit 4, which is not a part of the code call for which this particular circuit is adapted, produces no response from the selective signaling system.

As we shall soon see, the system disclosed by Fig. 9 is wired to respond only to the call 2167. Starting now from idle condition and receiving digit 2 which is the first digit in the assigned call number, we observe the following action. At the end of the third pulse, that is, the digit 2, tongues CA, CB, 1A, 1B, 2A and 2B are up, a path is closed from fixed terminal 113 through armature 1B to fixed terminal 114, thence through armature 2B to fixed terminal 118, thence through armature 3A and line 119 to armature 11B of digit counting relay DCR, thence through fixed terminal 122 to terminal 130 of coil *lc* in DCR. Now, since no more impulses are to be received immediately, during the interval following transmission of this first digit, slow-release relay SRR will release. As this takes place, contact 104 of SRR is closed thereby completing a circuit through battery 108 and coil *lc* of DCR. Although coil *lc* of DCR is now energized, no action at this moment takes place because coil *rc* of DCR is still energized through contact 105 and line 123. However, when contact 105 of slow-release relay opens, coil *rc* of digit counting relay DCR is deenergized, thus allowing armature 11A of DCR to come up in response to the magnetic attraction of the top left-hand pole-piece 141. Now, the first digit has been correctly dialed and counted by digit counting relay DCR. Although coil LC of PCR has been deenergized by the complete release of PR, coil RC remains energized by its connection through contact 137 and line 139 to terminal 130 of DCR and thence to battery 108 through contact 104.

We will now examine the action that occurs when the next digit of the assigned call number is dialed. At the start of the first impulse of the second digit, pulse relay PR closes, contact 102 closes, contact 101 opens, contact 137 opens, coil RC is thereby deenergized, and all PCR armatures drop to normal, thereby deenergizing coil *lc*. Armature 11A of digit counting relay DCR remains up due to the slow-release characteristic produced by a copper sleeve on the core of coil *lc* in DCR. Contact 103 closes and relay SRR is thereby energized. As relay SRR begins to come up, contact 105 closes thereby energizing coil *rc* of DCR. Contact 106 of SRR closes thereby energizing coil LC of PCR from battery 108 through armature 112, contact 105, contact 106, armature 110, contact 102, and line to LC terminal 120. Tongue CA of PCR comes up into conductive engagement with pole-piece 1. Contact 104 opens after 106 closes, but it has no effect since RC and *lc* are already deenergized. The period of continued energization of coil *lc* in DCR through its slow-release copper sleeve expires at some time after coil *rc* of DCR has been energized by the closure of contact 105, and at this time armature 11B of DCR comes up. At the end of the first impulse of the second digit, pulse relay PR opens, coils RC of PCR and *lc* of DCR are energized, and coil LC of PCR is deenergized so that tongue armature CB comes up into conductive engagement with pole-piece 4. At the start of the next impulse tongue 1A of PCR comes up. At the end of this impulse armature 1B comes up thereby closing a circuit between fixed terminal 113, through tongue 1B to fixed terminal 114, thence through tongue 2A and line 115 to armature 12B of DCR, thence through fixed terminal 116 and armature 11A of DCR, which is still in conductive engagement with pole-piece 141, to terminal 130 of coil *lc* which is thereby energized. Now, since this completes the second digit of the dial call, there will be an interval before start of the next digit and during this interval slow-release relay SRR will release thereby deenergizing coil *rc* of DCR and allowing armature 12A of DCR to be attracted upwardly by the magnetic pull of the third left-hand pole-piece 144 which is still energized by coil $lc$ of DCR through battery 108, contact 104 and relay PCR.

At the start of the first impulse of the next digit, relay PCR will reset to normal as we have seen before, and at this time digit counting relay DCR remains with its armatures 11A, 11B, and 12A held up by the slow-release characteristic of its coil $lc$. During this impulse coil $rc$ of DCR again becomes energized, the field of coil $lc$ subsides, and tongue 12B comes up into conductive engagement with pole-piece 147. If the digit 6 is next dialed, each of its seven impulses will cause sequential operation of pulse counting relay armatures CA, CB, 1A, 1B, 2A, 2B, 3A, 3B, 4A, 4B, 5A, 5B, and 6A, 6B, thereby completing a path from fixed terminal 113 through armature 1B to fixed terminal 1114, thence through armature 2B to fixed terminal 118, thence through armature 3B to fixed terminal 124, thence through armature 4B to fixed terminal 125, thence through armature 5B to fixed terminal 126, thence through armature 6B to fixed terminal 127, thence through armature 7A and line 132 to armature 13B of digit counting relay DCR, thence through armature 12A of DCR to fixed terminal 122, thence to $lc$ terminal 130, thereby preparing a circuit through which coil $lc$ of digit counting relay may become energized immediately upon the opening of slow-release relay SRR. Now, during the interval following transmission of this digit 6 slow-release relay SRR releases, contact 104 closes and the circuit is completed from battery 108 through digit counting relay coil $lc$. With coil $lc$ of DCR now energized, armature 13A of this relay will be attracted upwardly into conductive engagement with pole-piece 148 as soon as coil $rc$ of DCR is deenergized. This occurs upon complete release of SRR. Armature 13B of DCR remains held down until such time as coil $lc$ of this relay is deenergized and coil $rc$ again energized. This occurs at the start of the next impulse. The system has now received and counted three digits correctly dialed in the proper sequence.

When the fourth digit is dialed, digit No. 7 in this case, a circuit will be completed from battery 108, through line 133, armature 13A of digit counting relay DCR, fixed terminal 116, armature 11A, and $lc$ coil terminal 130, thereby again energizing coil $lc$ of DCR. Now, when coil $rc$ of DCR is deenergized by release of relay SRR, armature 14A of DCR will be attracted upwardly into conductive engagement with pole-piece 152 by the magnetic force from coil $lc$. With armature 14A held up in conductive engagement with left-hand pole-piece 152, a circuit is now established between line 134 through armature 14A, fixed terminal 129, armature 12A and fixed terminal 122 to energized $lc$ coil terminal 130 thereby impressing a potential across signal device 135 which will accordingly respond and give indication that the call 2167 has been dailed and received by this selective signaling system. This signal indicator may be an electric bell, a lamp, or other suitable signaling device. In answering the call thus signaled by lifting key 136, which may be a receiver or handset hook, the signal is extinguished. Thus we see that the circuit of Fig. 6 is responsive to the call 2167 when these digits are dialed in that order. In this signaling system, the same digit may appear in any order and any number of times in a call number. The call number illustrated by Fig. 6 was selected to show that the circuit is operative for consecutive numbers in either direction, that is, 2, 1 and 6, 7.

Let us now examine what action takes place in the event that a wrong digit is dialed after one or more correct digits have been received and counted by digit counting relay DCR. In this case, one or more armatures of the digit counting relay DCR are up for any number of counts and the pulse counting relay PCR is also up. Now, if a digit is dialed which is not next in sequence in the assigned call number, as the pulse relay PR closes, and contact 137 opens, the pulse counting relay PCR drops to normal and then again begins to count pulses of this digit in the same manner as before. Similarly, at the end of the train of pulses comprising this incorrect digit, the slow-release relay opens and applies potential from battery 108, through contact 104, to terminal 113 as before. However, in this case since there has been no circuit established through pulse counting relay to digit counting relay, coil $lc$ of DCR will be deenergized as will also coil $rc$, and consequently all armatures of DCR will drop to normal idle position. Thus we see that any digit not in the assigned call number and not in the proper sequence will clear all switches and restore the system to normal. In like manner, a single pulse will clear all switches because the first two armatures of pulse counting relay as illustrated by Fig. 9, are not intended ever to be connected with digit counting relay. Thus if the system is employed in a mobile radio telephone system a single pulse transmitted will serve to clear all receiver selective devices. As we have seen, the digit 1 comprises two impulses and similarly all other digits comprise one more impulse than the number of the digit.

Although the preferred arrangement illustrated by Fig. 9 employs code numbers having four digits and not more than ten units in each digit, the invention is not confined to such an arrangement. It will be obvious that any other numbering system employing either more or less than ten units per digit and either more or fewer than four digits per call could be used without departing from the principle of the invention herein disclosed.

Although the provision of two extra armatures CA and CB at the top of the pulse counting relay stack PCR is recommended, this arrangement is not essential for the operation of my selective signaling system and might indeed be omitted in some particular applications. However, the advantage of such arrangement as disclosed in Fig. 9 should be apparent. If the last digit or last digits sent out over a system happen to be the first, first two, or first three digits of another station call, the digit counting relay of such station or stations will remain up. This would do no harm in most cases for these switches will normally clear on the first digit received which is not wanted. However, the first digit of the next call might correspond to the last digit, or the first two digits might correspond to the last two, or the first three might correspond to the last three of some other station which has its digit counting relay up to the proper place to be signaled by the first, first two, or first three digits of the next number called. Furthermore, a station might have its pulse counting relay up and if it happens to be the station wanted on the next call, it would not be reached because the first digit received would clear the relay and this digit would not be recorded on the digit counting relay.

If the first two armatures of the pulse counting relay are reserved for clearing purposes, the circuit as illustrated by Fig. 9 will eliminate the possible difficulties suggested above. In this case the operator will automatically send out one pulse before commencing to dial. This pulse will clear all switches of all receiving stations throughout the system. By transmitting one pulse a short time after completing each call, or after a given call has been answered, the same results will obtain. Another advantage of this arrangement is that with all signal selectors normally in idle condition there is no battery drain anywhere in the system.

While the foregoing examples have been selected to illustrate the invention, it is to be understood that the invention is not confined to applications for mobile radio-telephone signaling, nor to the particular design of magnetic contact counting relay disclosed, nor to the particular circuit wiring illustrated, but that other uses may occur and other combinations of relay elements or circuit components could be arranged to accomplish the desired end within the spirit of my invention. Accordingly, the scope of the invention is to be determined only by the appended claims.

What is claimed is:

1. In an electrical impulse signal system, selective signaling means comprising in combination a first magnetic contact counting relay containing a plurality of movable contacts adjacent to a plurality of corresponding stationary contacts, means for displacing successively a number of movable contacts into electrical continuity with adjacent stationary contacts corresponding to the number of electrical impulses received, a slow-release relay adapted to remain operated during brief intervals between impulses received in uninterrupted train and to release said first counting relay during transmission interruptions at the end of each train of impulses comprising a group, a second magnetic contact counting relay similar to the first and interconnected therewith to count any number of distinctive groups of impulses received in a particular sequence corresponding to a predetermined code, means for resetting said second counting relay upon the reception of any group of impulses not a part of the predetermined code, a signaling indicator cooperatively connected with said second counting relay so as to be operated by the registration on said second counting relay of the last group of impulses comprising the predetermined code, and means for restoring both counting relays to normal prior to transmission of any code.

2. In an electrical impulse signaling system, selective receiving means comprising an impulse counting relay containing a plurality of movable magnetic contacts adjacent to a plurality of stationary magnetic contacts, electromagnetic means for successively displacing a number of movable contacts into electrical continuity with adjacent stationary contacts, means for resetting said impulse counting relay to normal following registration of each group of impulses, a group counting relay containing a plurality of movable contacts and a plurality of stationary contacts, and means controlled by said impulse counting relay to displace successively movable contacts of said group counting relay into electrical continuity with adjacent stationary contacts corresponding to any number of distinctive impulse groups received in accordance with a predetermined code.

3. In a selective signaling system a receiving station comprising first and second magnetic contact counting relays adapted to respond to a distinctive sequence of impulse groups comprising any predetermined number of groups, means for restoring said second counting relay to normal upon the reception of any combination of impulse groups other than the distinctive sequence for which said relay is adapted, signal indicating means connected with said second counting relay and controlled by reception of a particular sequence of impulse groups, and means for restoring both counting relays to normal prior to any transmission.

4. In a telephone station signaling system selective receiving means comprising in combination a first magnetic contact counting relay and a second magnetic contact counting relay, said first counting relay responsive to individual impulses, connections whereby said second counting relay is responsive to any predetermined number of coded groups of impulses as counted by said first relay, means for restoring both of said relays to normal prior to transmission of a code, signal indicator means connected with said second counting relay and operable thereby upon reception of said number of groups of impulses received in a predetermined code, and means for restoring said second counting relay to normal upon reception of any other code.

5. In a signaling system, means for receiving a train of electrical impulses comprising an impulse responsive relay, a first magnetic contact counting relay operable by said impulse responsive relay to count individual impulses received in an uninterrupted train, a slow-release relay connected with said impulse responsive relay and said counting relay and adapted to remain operated during short intervals between successive impulses of an uninterrupted train and to release said first counting relay during longer intervals between impulses upon each interruption of a train, a second magnetic contact counting relay connected with said first counting relay, said slow-release relay and said impulse responsive relay in a manner such that said second counting relay is only operated upon complete counting of a predetermined number of impulses by said first counting relay, a signaling device connected with said second counting relay and operable only upon complete counting of a predetermined number of trains of impulses by said second counting relay, said predetermined number of trains being two or more, slow-release means in said second counting relay to hold said relay operated during intervals between successive trains of impulses and to release said second counting relay during prolonged intervals when the impulses of a train as counted by said first counting relay fail to correspond to aforesaid predetermined number, and means for restoring said first and second counting relays to normal prior to each transmission.

6. In a selective signaling system, an incoming conductive path supplying sequential groups of electrical impulses, selective receiving means comprising an impulse actuated relay, a first magnetic contact counting relay controlled by said impulse actuated relay to count uninterrupted impulses received in a group, a slow-release relay connected with said impulse actuated relay and said first counting relay and adapted to remain operated during short intervals between successive impulses of a group and to release said first counting relay during longer intervals between successive groups of impulses, a second magnetic contact counting relay connected with said first counting relay to count any number of successive groups of impulses received in a particular sequence corresponding to a predetermined code, a signaling device connected with said second counting relay and operable thereby upon complete counting of the last group of impulses comprising a completed code signal, slow-release means in said second counting relay to hold said relay operated during intervals between successive groups of impulses and to release said second counting relay during prolonged intervals when the impulses of a group as counted by said first counting relay are not in said predetermined code, and means for restoring said first and second counting relays to normal prior to each transmission.

7. In a signal receiving system, selective receiving means at a called station comprising a pulsing relay operated by electrical impulses, a magnetic contact impulse counting relay and a slow-release relay operated by said pulsing relay, said slow-release relay adapted to remain operated during brief intervals between successive impulses of a group and to release said impulse counting relay during longer intervals following transmission of each complete group of said impulses, a second magnetic contact counting relay in cooperation with aforesaid relays having armatures thereof interconnected with selected armatures of said first counting relay in accordance with a code distinctive of said called station such that said second counting relay is operated to count any number of successive groups of impulses as received in a particular sequence by said first counting relay in accordance with said distinctive code, a signaling device operable by said second counting relay upon reception of the last distinctive group of impulses comprising the completed call of said station, means for restoring said selective receiving means to normal upon the reception of any group of impulses not a part of said code, and means for restoring said selective receiving means to normal prior to each transmission.

8. In a station calling system, selective receiving means at a called station comprising in combination a pulsing relay responsive to received impulses, a magnetic contact impulse counting relay controlled by said pulsing relay to count the number of impulses received in a group, a slow-release relay adapted to deenergize said impulse counting relay during intervals between groups of received impulses, and a group counting magnetic contact relay controlled by said slow-release relay and said impulse counting relay to count any number of correct groups received sequentially in accordance with the combination of a distinctive code, means to restore said combination of receiving elements to normal upon reception of impulses in any other combination, and an indicating device controlled by said group counting relay to indicate registration thereon of all groups of said distinctive code.

9. In an electrical impulse signal system, selective signaling means comprising in combination a first magnetic contact counting relay containing a plurality of movable magnetic members adjacent to a plurality of corresponding stationary magnetic members, said stationary members arranged in two groups adjacent opposite sides of said movable members, electromagnetic means surrounding each group of stationary members for displacing successively a number of movable members into magnetic and electrical continuity with adjacent stationary members corresponding to the number of electrical impulses received, a slow release relay adapted to remain operated during brief intervals between impulses received in uninterrupted train and to release said first counting relay during transmission interruptions at the end of each train of impulses comprising a group, a second magnetic contact counting relay corresponding to the first and interconnected therewith to count any number of distinctive groups of impulses received in a particular sequence corresponding to a predetermined code, means for resetting said second counting relay upon the reception of any group of impulses not a part of the predetermined code, a signaling indicator cooperatively connected with said second counting relay so as to be operated by the registration on said second counting relay of the last group of impulses comprising the predetermined code, and means for restoring both counting relays to normal prior to transmission of any code.

10. In an electrical impulse signaling system, selective receiving means comprising a magnetic contact impulse counting relay having a plurality of movable magnetic contact members interleaved between a plurality of stationary magnetic members arranged in two adjacent rows, electromagnetic means surrounding each row of said stationary members for successively displacing a number of movable magnetic contact members into electrical and magnetic continuity with adjoining stationary members in both rows corresponding to the number of electrical impulses received, means for resetting said impulse counting relay to normal following reception of each group of impulses, a group counting relay having a plurality of movable magnetic contact members and a plurality of stationary members arranged in like manner to said impulse counting relay, means controlled by said impulse counting relay to displace successively movable contacts of said group counting relay into electrical continuity with adjacent stationary contacts thereof corresponding to any number of distinctive impulse groups received in accordance with a predetermined code, a signal indicator connected with a source of potential and a pair of contact members of said group counting relay in a manner to be operated by the closure of said contacts upon reception of the last group of impulses comprising said predetermined code, and means for restoring both counting relays to normal prior to transmission of any code.

CLARENCE N. HICKMAN.

REFERENCES CITED

The following references are of record in the file of this patent:

UNITED STATES PATENTS

| Number | Name | Date |
|---|---|---|
| 1,662,877 | Almquist | Mar. 20, 1928 |
| 1,867,209 | Chauveau | July 12, 1932 |
| 1,943,475 | Gurley | Jan. 16, 1934 |
| 1,968,078 | Hershey | July 31, 1934 |
| 2,063,354 | Thorp | Dec. 8, 1936 |
| 2,208,655 | Wright | July 23, 1940 |
| 2,212,830 | Hickman et al. | Aug. 27, 1940 |
| 2,291,244 | Lewis et al. | July 28, 1942 |
| 2,293,823 | Hickman et al. | Aug. 25, 1942 |
| 2,305,450 | Stibitz | Dec. 15, 1942 |
| 2,441,001 | Bellamy | May 4, 1948 |